(12) United States Patent
Nyce et al.

(10) Patent No.: US 7,340,951 B2
(45) Date of Patent: Mar. 11, 2008

(54) DISTRIBUTED IMPEDANCE SENSOR

(75) Inventors: David Scott Nyce, Apex, NC (US);
Yuriy Nikitich Pchelnikov, Cary, NC (US)

(73) Assignee: David S. Nyce, Apex, NC (US)

( * ) Notice: Subject to any disclaimer, the term of this patent is extended or adjusted under 35 U.S.C. 154(b) by 365 days.

(21) Appl. No.: 11/267,434

(22) Filed: Nov. 4, 2005

(65) Prior Publication Data
US 2007/0101811 A1    May 10, 2007

(51) Int. Cl.
*G01F 23/26* (2006.01)
(52) U.S. Cl. .................................... 73/304 C
(58) Field of Classification Search ............... 73/304 C
See application file for complete search history.

(56) References Cited

U.S. PATENT DOCUMENTS

| | | | | |
|---|---|---|---|---|
| 3,333,160 A | * | 7/1967 | Gorski | 361/181 |
| 3,746,975 A | * | 7/1973 | Maltby | 324/720 |
| 4,201,085 A | * | 5/1980 | Larson | 73/304 C |
| 4,603,581 A | * | 8/1986 | Yamanoue et al. | 73/304 C |
| 5,005,407 A | * | 4/1991 | Koon | 73/290 R |
| 6,255,933 B1 | * | 7/2001 | Iwao | 336/200 |
| 6,490,920 B1 | * | 12/2002 | Netzer | 73/304 C |
| 7,258,005 B2 | * | 8/2007 | Nyce | 73/304 C |

* cited by examiner

Primary Examiner—Hezron Williams
Assistant Examiner—Rodney Frank

(57) ABSTRACT

An apparatus is disclosed for measuring one or more parameters of a variable physical structure, at least one of the parameters being fluid level, position, velocity or acceleration. The apparatus includes an electromagnetic sensing element comprising at least two electrically conductive members that are electrically insulated from one another. A distributed capacitance and a distributed inductance are each formed along a length of the sensing element. The inductive reactance is at least ten percent of the capacitive reactance, thereby allowing the capacitance to be distributed, rather than acting as a "lump capacitance". The distributed capacitance enables shaping of the electric and magnetic fields around the electromagnetic sensing element so that disturbance by nearby electromagnetic fields, conductors, and dielectrics is minimized.

When the apparatus is configured as a fluid level sensor, the capacitance is affected by the permittivity and the level of the measured fluid. A reference sensor can be used to compensate for changes in the permittivity of the fluid.

When the apparatus is configured as a position sensor, the capacitance and/or inductance are affected by the position of an electrically conductive or dielectric target. The position measurement can be differentiated to obtain measurements of velocity or acceleration. Electronic circuits for operating the sensing element are also shown.

19 Claims, 9 Drawing Sheets

DISTRIBUTED IMPEDANCE SENSOR

BACKGROUND OF THE INVENTION

1. Field of the Invention

The present invention relates to sensors for measuring a parameter of a variable physical structure. The variable structure may include a fluid within a vessel, or it may include a movable solid target. More specifically, the present invention relates to sensors that measure the parameter through the use of an electromagnetic field that is disposed in a volume that includes the variable structure. In the case of a fluid variable structure, the parameter is measured and utilized to determine a fluid level. In the case of a solid target, the parameter is measured and utilized to determine a position, velocity, or acceleration of the target as the target moves along a sensing axis.

2. Description of the Prior Art

According to the present invention, a fluid level can be measured through the application of an electromagnetic field, without the use of a float. The present invention also teaches the measurement of a movable target without physical contact between the sensor and the target. The simple use of an electromagnetic field for measuring liquid level and position is old in the art. Liquid level sensors using an electromagnetic field and having no float (floatless) have been produced with advantages over those that utilize a float. These advantages include lower cost, and removal of the possibility a float becoming stuck in one position so that it does not follow the liquid level.

Position sensors using an electromagnetic field for non-contact measurement have been produced using capacitive, inductive, and eddy current technologies.

Matulek, U.S. Pat. No. 6,164,132, teaches a dual capacitive sensor array liquid level indicator. An array of capacitive sensors is superposed on each side of a planar sensing element, one sensor from each side working together as a pair. The arrays are connected to electronic circuits that determine which sensor pairs are submerged in the liquid and which are not submerged. This provides a liquid level measurement with a resolution depending on the number of sensor pairs in the array. A detection circuit is associated with each sensor pair. Disadvantages of this sensing system, compared to the present invention, include limited resolution, higher electronics cost, and limited sensitivity.

In Netzer, U.S. Pat. No. 6,490,920, a compensated capacitive liquid level sensor is taught with at least three electrodes forming at least two capacitances that vary with the liquid level. The capacitance versus level functions of the two capacitances differ from each other. A ratio of the functions is utilized for compensation of liquids having various permittivities. Disadvantages of this sensing system, compared to the present invention, include a very small signal level, resulting in reduced stability when the liquid level is low, and the requirement for a more complicated set of electronics. When the liquid level is very low, both measured capacitances are very small, and are therefore easily affected by parasitic capacitances and electrical noise. Since the two capacitances are ratioed to compensate for the liquid permittivity, the stability of the result is reduced.

Pchelnikov and Nyce, U.S. Pat. No. 6,293,142 B1, teach a liquid level sensor apparatus in which an electrodynamic element produces an electromagnetic field, in the form of at least one slowed electromagnetic wave (slowed-wave), within a volume that contains the measured liquid. An electromagnetic field parameter is measured that varies with the measurand. The electromagnetic field has a suitable distribution for measuring of the variation in propagation constant of the slowed electromagnetic wave as the electromagnetic field parameter.

In contrast to the prior art inventions cited above, the present invention provides a floatless fluid level sensor with low cost, high resolution, and good sensitivity. When used for fluid level sensing, the present invention provides an advantage of distributed impedance over the length of the sensing element, while operating in a desired frequency range with increased resolution. The measurement of impedance, rather than propagation constant or resonant frequency, allows the use of simple and inexpensive circuitry. Distributing the impedance along the length of the sensor enhances the ability of the sensing element to control the shape of the electromagnetic field, while still operating in a relatively low frequency range for a given sensing element length. The lower frequency range allows the use of lower cost electronics. The shaped field allows measurement of the desired target while largely ignoring other nearby conductive and dielectric materials. The increased resolution allows the design of higher performance sensors.

When used as a linear position sensor, the present invention provides the advantages of non-contact measurement, while being producible at low cost, and with an easily adjustable measuring length. Here also, the measurement of impedance, rather than propagation constant or resonant frequency, allows the use of simple and inexpensive circuitry. As in a fluid level sensor, distributing the impedance along the length of the sensing element enhances the ability of the sensor to control the shape of the electromagnetic field, while still operating in a relatively low frequency range for a given sensing element length. Again, the lower frequency range allows the use of lower cost electronics. This is in contrast to prior art non-contact position sensors, for example:

In Fiori, U.S. Pat. No. 4,637,265, a non-contact sensor apparatus uses the combination of a stationary coil and a movable coil, connected into stationary and movable tank circuits, which are inductively coupled to produce a double resonance curve in the stationary tank circuit. Disadvantages of this sensing system, compared to the present invention, include the need for an electronic circuit disposed within the movable member of a position sensor, and the need for a substantially more complicated set of electronics as taught in the specification. Another disadvantage of this system is the need for a stationary tank circuit, meaning that once fabricated, the sensor length can not be changed without destroying the tank circuit.

In Brosh and Fiori, U.S. Pat. No. 4,658,153, a non-contact sensor apparatus comprises a fixed planar board with serpentine coil structures of relatively low resistance and inductance, driven in resonance mode with a frequency output according to the position of a movable planar member. Some disadvantages of this system include the need for highly stable electronics, since the inductance is low, and the fixed sensing length, which cannot be easily changed once the sensing element has been fabricated.

BRIEF SUMMARY OF THE INVENTION

The present invention employs at least first and second conductor patterns disposed along a measuring path, the path can also be called the sensing axis or sensitive axis. The conductor patterns together comprise a sensing element, having at least two terminals for electrical connection. At least two of the conductor patterns are similar, or can be identical, and are electrically insulated from one another.

In a first preferred embodiment of the invention, at least two of the conductor patterns, taken individually, each approximates a helical shape. Two of such conductors thus approximate a double helix configuration. The sensing element has an electrical impedance that can be measured between at least two of the terminals. For measuring a fluid level, the sensing element is positioned so the sensing axis is approximately vertical, and the sensing element is submerged at least partially into or located proximate the fluid to be measured. Changes in the level of the fluid affect the impedance of the sensing element. The terminals of the sensing element are connected to an electronic circuit. The electronic circuit generates an alternating current oscillation and provides a signal that is dependent upon the sensing element impedance, and thus, the level of the fluid with respect to the sensing element. The sensing element impedance is the vector sum of resistance, capacitive reactance, and inductive reactance. Changes in the level of a dielectric fluid mainly affect the capacitive reactance of the sensing element.

When measuring the position, velocity, or acceleration of a target as it moves along a motion axis, the sensing element is positioned so that its sensing axis is approximately aligned with the motion axis. The target can be an electrical conductor or a dielectric material. Changes in the position of the target along the motion axis cause changes in the impedance, including capacitive and/or inductive reactance, of the sensing element.

In the cases of both fluid level and position measurement, the electrical circuit is operated within a range of frequencies where the inductive reactance is at least equal to one tenth of the capacitive reactance. In prior art capacitive or slowed-wave sensors, such a frequency would tend to be very high with sensor lengths of less than one meter long. With capacitive or slowed-wave sensors of prior art, it is typical that the measured capacitive reactance will be much higher than the inductive reactance, so much so, that the inductive reactance is usually considered to be negligible. The inductance of prior art capacitive sensors is kept low in order to better detect only the changes in the capacitance. With the inductive reactance being therefore negligible, the capacitance can be considered as a single capacitance, or so-called "lump capacitance". Conversely, in the present invention, both capacitive and inductive impedances are utilized to the benefit of the measurement technique.

For example, when measuring the level of a dielectric fluid according to the present invention, the capacitance changes with the level of the fluid. The electronic circuit indicates the level by directly or indirectly measuring the change in capacitance. However, according to a preferred embodiment of the present invention, it is important that the inductive reactance be non-negligible (i.e. it must be more than ten percent of the capacitive reactance). This allows the capacitance to be considered as a multitude of individual capacitances, each separated from the next by a series inductance. This is accomplished by using, for example, a dual helix configuration instead of, for example, an inter-digital comb configuration that is commonly used with capacitive sensors.

In the example above, of a sensor according to the present invention for measuring the level of a dielectric fluid, separating the capacitances by series inductances provides a distributed impedance, whereby both the capacitances and inductances of the sensing element are distributed along the sensing axis. This enables shaping of the electromagnetic field along the sensing element as may be desired for better performance of the sensor. When sensing a dielectric material according to the present invention, the electromagnetic field is shaped so that the electric field penetrates into the measured material, but is concentrated in a volume close to the sensing element in order to avoid sensing unwanted materials that may be nearby. Likewise, when sensing an electrically conductive material, the electromagnetic field is shaped so that the magnetic field penetrates into the measured material, but is concentrated in a volume close to the sensing element in order to avoid sensing unwanted conductive materials that may be nearby.

According to the present invention, at least two of the conductive members of the sensing element are excited by an alternating current oscillator in an anti-phase mode. This means that a first terminal can be connected to ground, while a second terminal is alternately energized with a positive and then a negative voltage. Alternatively, the first terminal can instead be connected to a first alternating voltage while the second terminal is connected to a second alternating voltage that is not in phase with the voltage of the first terminal. Such anti-phase energizing of the sensing element allows for the measurement of the sensing element AC (alternating current) impedance, and changes in the impedance that are caused by changes in a parameter of the measured variable structure.

DETAILED DESCRIPTION OF THE INVENTION

Figure 1:
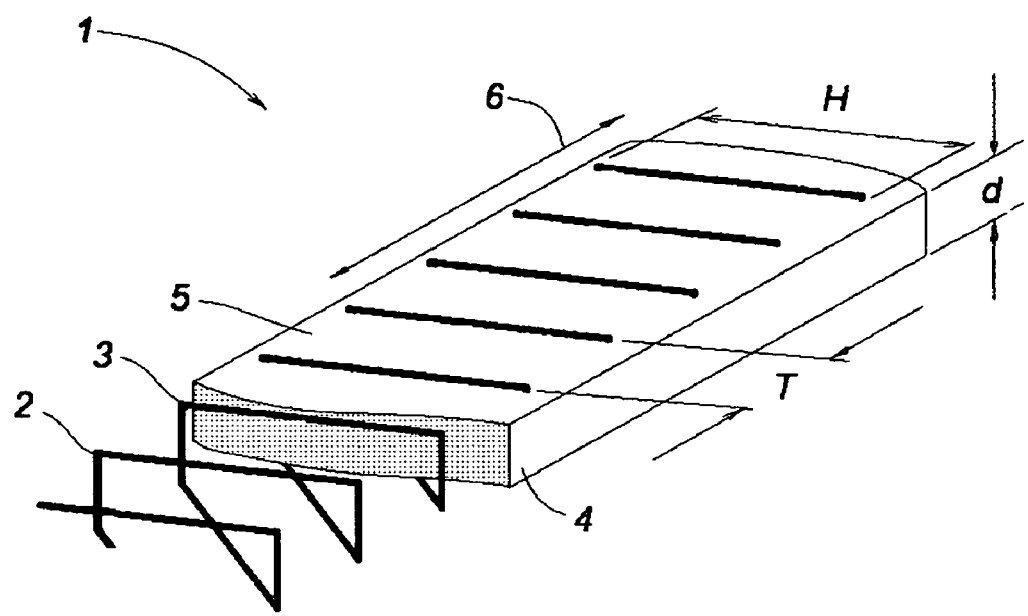
FIG. 1 shows a linear sensing element 1 according to the present invention, with first conductor pattern 2, and second conductor pattern 3, positioned along dielectric base 4, with spacing 5 along sensing axis 6. The conductor pattern has a width H and a period T. The dielectric base has a thickness d.

Prior art non-contact sensors using an electromagnetic field to determine fluid level or the position of a conductive or dielectric target have suffered from high manufacturing cost or low performance. The present invention overcomes these problems by utilizing a novel set of technical advancements that can be used together or independently. A first embodiment of the present invention is shown in FIG. 1, in which two conductors 2, 3, are shaped as a double helix, also called a bifilar helix. This provides an improvement over the well known configuration of interdigital combs of prior art that is commonly used in capacitive sensors. In prior art interdigital comb configurations, it is desirable to maximize the starting capacitance between the two (or more) conductor plates that form the capacitance. The starting capacitance is maximized by making the areas of the plates as large as is practical for a given sensor size. The plate size, and capacitance, is maximized by reducing the spacing between adjacent fingers (of a comb) by as much as is practical. This means that the length of conductor that connects one finger to the next finger of the same comb electrode is also reduced. The result is that starting capacitance due to plate area is maximized, while inductance due to the interconnection conductors is minimized.

In a typical capacitive sensor, the sensor capacitance increases as a dielectric target increases its coupling to the sensor in response to an increase in the measurand. In prior art interdigital comb configurations, it is also desirable to maximize this change in capacitance that results from a given change in the measurand, as a percentage of the starting capacitance. This percentage can be called the sensitivity of the sensing element. The percentage change in capacitance is maximized by providing a large number of the interdigitated fingers, so more of the fringing field will extend into the measured medium. This also minimizes inductance by shortening the length of the interconnection conductors. Therefore, because of the desire to maximize capacitance, inductance in the prior art interdigital configuration is negligible. So, with prior art interdigital capacitive sensors, the inductive reactance at frequencies of less than 100 MHz is negligible.

Conversely, preferred embodiments of the present invention rely upon having a non-negligible inductance. Preferred sensing elements according to the present invention have sufficient inductance so that the inductive reactance is at least equal to 10% of the capacitive reactance, and typically will range from 20% to 100% or more, of the capacitive reactance when used in the desired frequency range. The desired frequency range is between 0.5 MHz and 100 MHz. The operating frequency of a distributed impedance sensing element according to the present invention should be above 0.5 MHz in order to avoid sensitivity to water, moisture, and humidity. The operating frequency should be below 100 MHz in order to utilize low cost electronics, and minimize radio frequency emissions.

Figure 2:
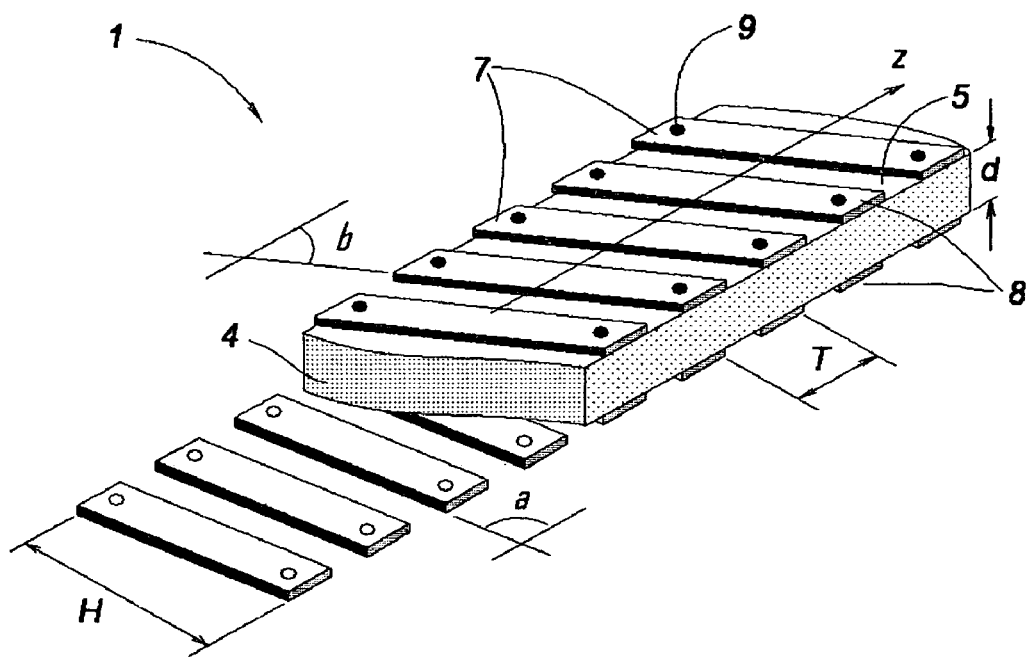
FIG. 2 shows a preferred embodiment of the present invention in which the sensing element 1 is formed by parallel rows of conductive members, in the form of tapes, as conductive members, 7, 8, on both sides of a dielectric base 4, with feed-through connections, 9, and the tapes separated by spacing, 5. Tapes on the bottom are inclined at angle a, while tapes on the top are inclined at angle b.

A bifilar helix configuration provides sufficient inductance so that techniques to increase the sensing element capacitance can be utilized, while still retaining the requirement that the inductive reactance equal at least 10% of the capacitive reactance within the range of 0.5 to 100 MHz. FIG. 2 shows a preferred embodiment of the present invention, utilizing a bifilar helix configuration in which sections of the conductors have been flattened into tapes in order to form conductive members, 7, 8. As shown in the figure, the rightmost tape on the top surface is a part of electrode 7; feedthrough 9 connects it to the third tape from the right on the bottom. The edge of this third bottom tape can be seen in the figure. With additional feedthroughs and alternate tapes, electrode 7 is formed in a helix around dielectric base, 4. Likewise, electrode 8 is formed around dielectric base, 4, and is spaced from electrode 7 by spacing 5. Spacing 5 and electrodes 7, 8, together form periodic rows of tapes, having period T.

In forming the helix, tapes on the bottom surface are inclined at angle a, have width H, and period T. It follows from this that $$\tan a \approx \frac{H}{T}, \tag{a}$$

Tapes on the top surface are inclined at angle b. To provide a symmetrical form, angle b can be set equal to −a, as shown, with respect to 90°. Alternatively, other relationships between angles a and b can be utilized, as long as electrodes 7 and 8 remain electrically insulated from one another.

In preferred embodiments of the present invention, period T and thickness d of dielectric base 4 follow the relationship $$d \geq \frac{T}{2\pi}. \tag{b}$$

Following inequality (b) allows a reduction in the capacitive coupling between tapes of conductive members, 7, 8, on opposing sides of dielectric base 4. This reduces the starting capacitance, but has little effect on the capacitance change due to a change in the measurand. The result is an increase in the sensing element sensitivity.

Figure 3:
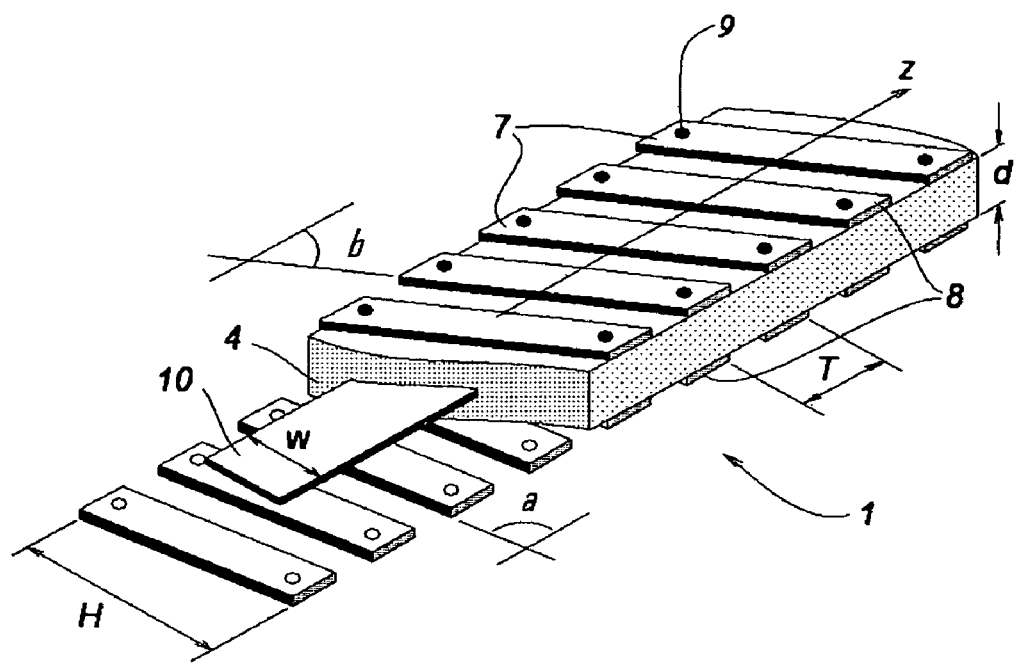
FIG. 3 illustrates a sensing element 1; with a screen conductor 10 placed within dielectric base 4, between layers of conductive members 7 and 8.

FIG. 3 shows the addition of a screen conductor, 10. It has the form of a relatively narrow tape, and is positioned within dielectric base 4. Being a screen conductor, it decreases the electric field strength and thus decreases sensitivity. If the screen width, w, is relatively small, the decrease in sensitivity is small.

Figure 10:
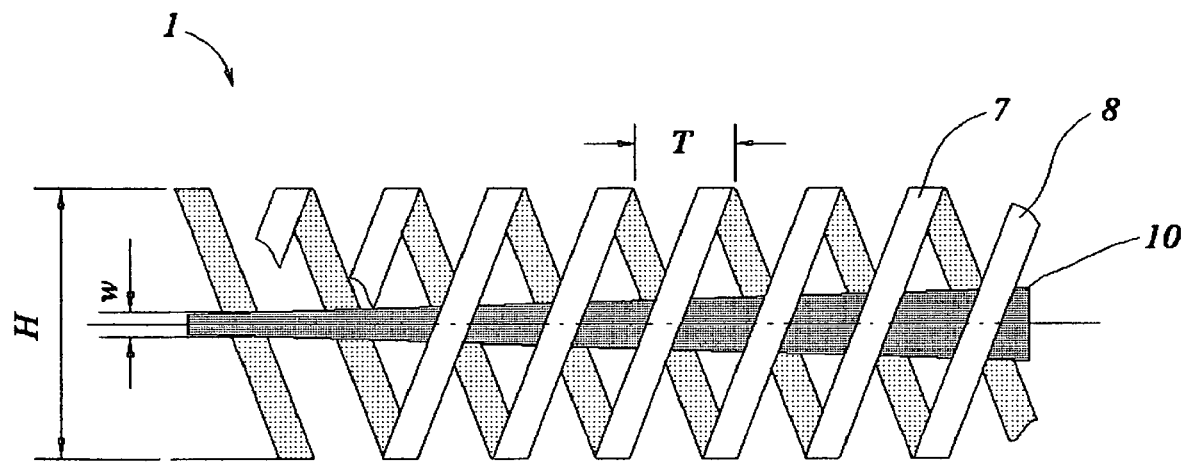
FIG. 10 shows sensing element 1 with a screen conductor 10, having a width w that changes along the length of the sensing element.

It sometimes becomes necessary to correct a nonlinearity in a sensing element, such as when the sensing element is used as a fluid level sensor. Since screen 10 has a small effect on sensitivity when its width, w, is small, and a larger effect when w is larger, this effect can be used to correct for nonlinearity. For example, if the sensitivity is high at the bottom of a screen-less fluid level sensor, and decreases toward the top, then a screen can be added to compensate for this. The width of the screen can be larger at the bottom and decrease toward the top of the sensor. The rate of change of screen width over the sensor length can be adjusted as needed to linearize the sensor output. A screen conductor with a changing width along the length of the sensing element is shown in FIG. 10. In this case, it is not necessary to electrically connect the screen to any other conductor.

Figure 4:
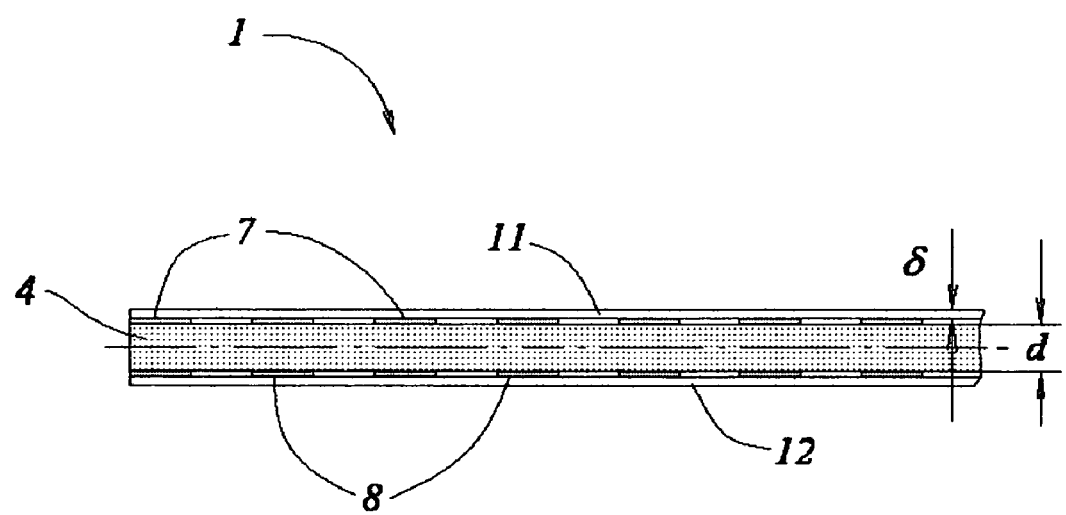
FIG. 4 shows sensing element 1 in which conductive members 7 and 8 are covered by dielectric coatings 11, 12, each having a thickness δ.

In another preferred embodiment of the present invention, electrodes 7 and 8 are covered by thin layers, 11 and 12, of a dielectric material having a relatively low relative permittivity. This is shown in FIG. 4. These layers protect the electrodes from damage caused by corrosive fluids or by abrasion. The thickness δ of layers 11 and 12 should be small in comparison to period T of the electrode tapes. In the case where the permittivity of the dielectric layers 11 and 12, and the measured medium (i.e. a fluid or other target being measured) are approximately equal, the ratio η of electromagnetic energy in the measured medium to the electromagnetic energy in the coating can be defined by the formula:

$$\eta = \frac{e^{-2\pi\frac{\delta}{T}}}{1 - e^{-2\pi\frac{\delta}{T}}}. \tag{c}$$

It follows from (c) that for δ/T=0.1, η=1.14. That is, in this case, adding layers 11, 12, decreases the sensing element sensitivity by approximately 47%. (i.e. 1.14/(1+1.14)=0.53). As another example, for δ/T=0.05, the decrease in sensitivity will be 27%.

Figure 8:
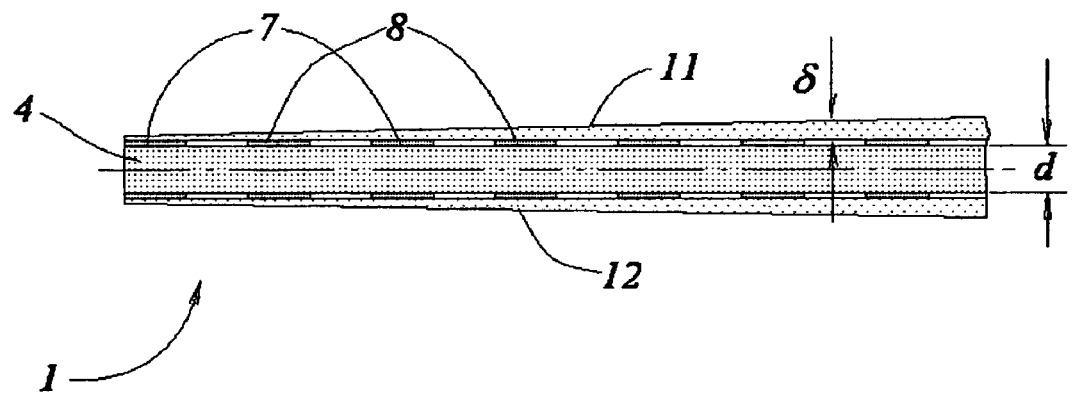
FIG. 8 shows sensing element 1 having a coating 11, 12, with a thickness δ that changes along the length of the sensing element.

Since the addition of layers 11, 12, causes a decrease in sensitivity according to their thickness, δ, this property may also be used to correct for nonlinearity in a sensing element, in a similar way as described above for the width of screen 10. In this case, the thickness of dielectric layers 11, 12, can be changed along the length of the sensing element, as shown in FIG. 8.

Figure 5:
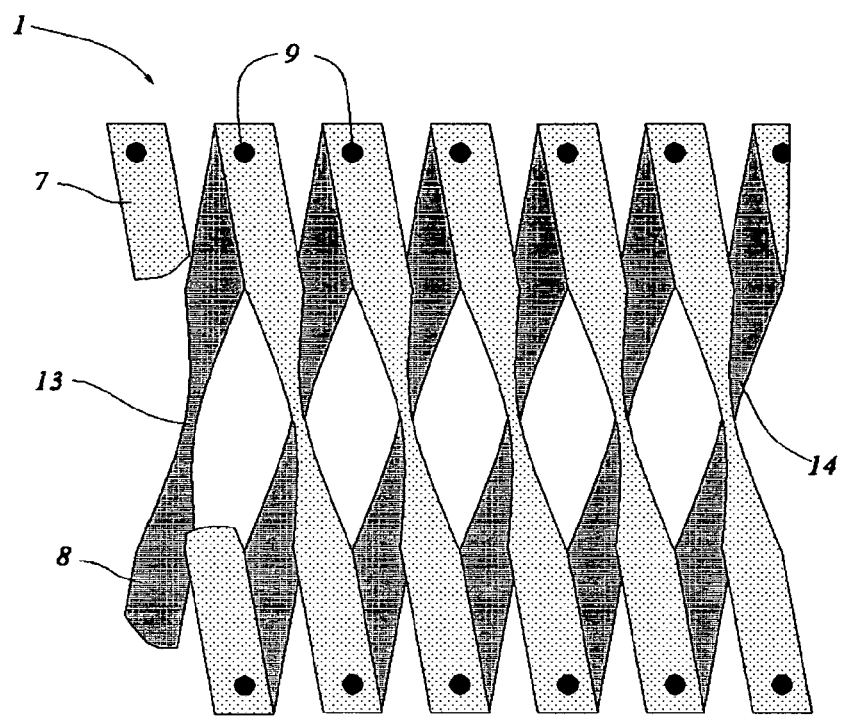
FIG. 5 illustrates a preferred embodiment of the present invention in which conductive members 7 and 8, forming conductor patterns of sensing element 1, are narrowed in the vicinity of the cross-over areas 13, 14.
Figure 6:
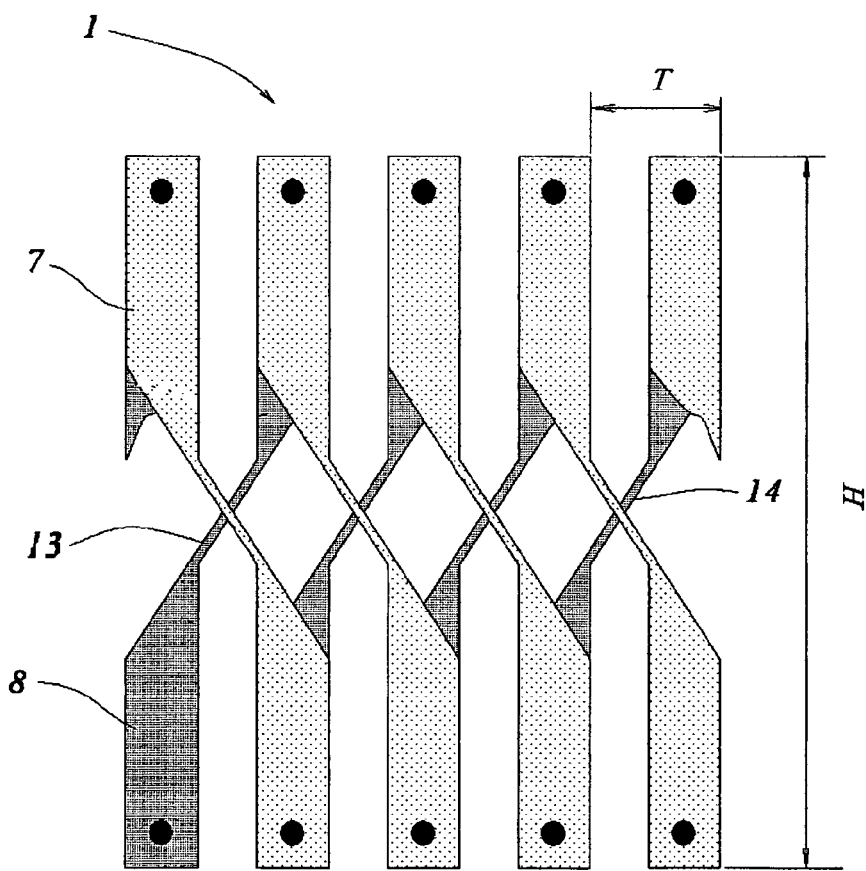
FIG. 6 shows an alternative version of sensing element 1, also with conductive members 7 and 8 narrowed at cross-over areas 13, 14, with the crossover areas arranged to form period T.

In another preferred embodiment of the present invention, shown in FIGS. 5 and 6, the tapes of electrodes 7, 8, are more narrow in the crossover areas where a top tape and a bottom tape cross one another. Capacitance that is formed between electrodes 7 and 8 in these areas is thus minimized. In this case, the capacitive coupling between tapes decreases approximately proportionally to the decrease in the width of the tapes. This is an advantage because such capacitance is mostly affected by the permittivity and thickness of the dielectric base, 4, rather than by the measured material. This narrowing of cross-over areas results in a lowering of the base capacitance but has little effect on the capacitance change that occurs with a change in the measurand. FIG. 5 shows a smoothly changing width of crossover areas 13, 14, of angled tapes, forming period T, of electrodes 7, 8. FIG. 6 shows an alternative configuration with approximately parallel tapes of electrodes 7, 8, having crossover areas 13, 14, angled to form period T. The configurations of both FIG. 5 and FIG. 6 increase the ratio of the electromagnetic field in the measured target to the electromagnetic field within the dielectric base, thus increasing sensitivity to the target.

Such narrowing of these cross-over areas also allows the thickness d of dielectric base 4 to be decreased to an amount smaller than indicated by formula b, while reducing the amount of decrease in the sensitivity of the sensing element that would otherwise occur.

As shown above, the percentage of the total electric field energy that is disposed in the measuring volume increases with a decrease in period T, an increase in thickness d of dielectric base 4, or a decrease in thickness δ of coatings 11, 12. Each of these effects make it possible to change sensitivity along the length of the sensing element. This can be used for linearization of measurements as explained above.

Figure 7:
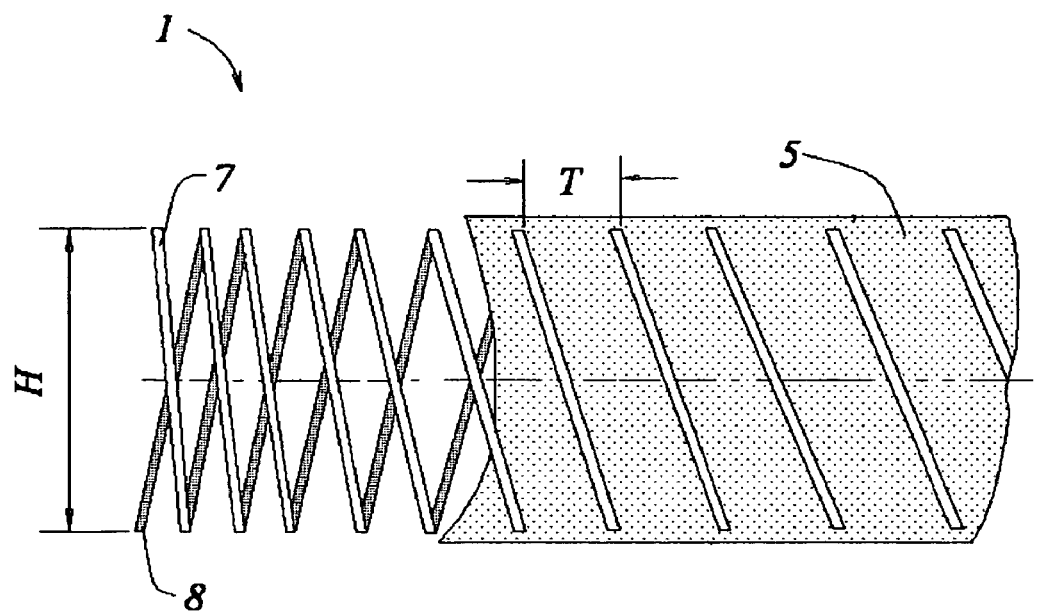
FIG. 7 shows sensing element 1 with the conductor patterns 7, 8, having a period T that changes along the length of the sensing element by varying the spacing, 5.
Figure 9:
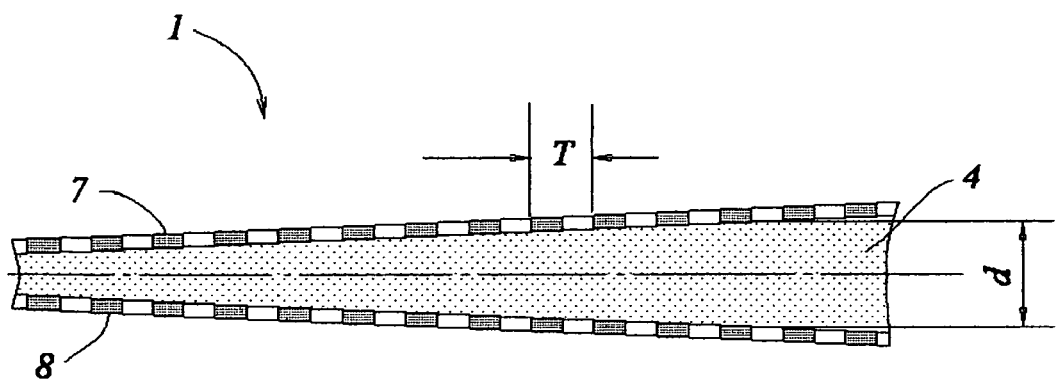
FIG. 9 shows sensing element 1 with a dielectric base 4, having a thickness d that changes along the length of the sensing element.

In FIG. 7, changing the period, T, of conductive members, 7, 8, along the length of sensing element 1, can be used to change the linearity of the measurement. Similarly, in FIG. 8, changing the thickness, δ, of the coating, 11, 12, along the length of sensing element 1, can be used to change the linearity of the measurement. Also, in FIG. 9, changing the thickness, d, of dielectric base, 4, along the length of sensing element 1, can be used to change the linearity of the measurement. Likewise, in FIG. 10, changing the width, w, of screen 10, along the length of sensing element 1, can be used to change the linearity of the measurement.

Figure 11:
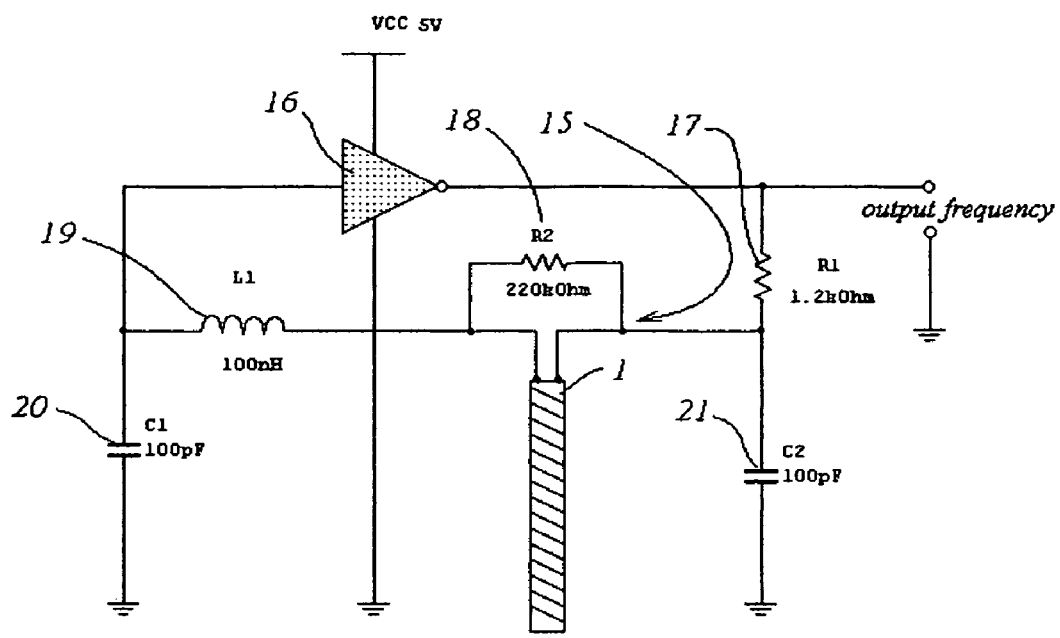
FIG. 11 shows an oscillator circuit with sensing element 1 connected in the feedback circuit 15, of inverter, 16, to affect the operating frequency of the oscillator so that a change in the impedance of the sensing element causes a change in the operating frequency of the oscillator. Resistor, 17, limits inverter current, resistor, 18, limits the effect of sensing element resistance, inductor 19, and capacitors, 20, 21, provide phase shift to ensure oscillation.

If sensing element 1 is connected in the feedback circuit of an oscillator, e.g. the Pierce oscillator shown in FIG. 11, it can be used to control the oscillator frequency, whether the changes in the measurand cause a change in the sensing element inductive impedance or capacitive impedance (or both). At an oscillator operating frequency lower than the first resonant frequency of the sensing element, sensing element 1 has a net capacitive impedance if it is open ended, but has a net inductive impedance if the end is shorted. In FIG. 11, open ended sensing element 1 is connected in series with inductor 19, which together with resistor 17, connects the output of inverter 16 to its input, thus comprising a feedback circuit, 15. Resistor 17 serves to limit peak current in inverter 16. Capacitors 20, 21, provide phase shift to ensure oscillation. Resistor 18 provides better oscillator stability and reduces sensitivity to resistivity of the sensing element. In the configuration of FIG. 11, changes in the measurand of sensing element 1 result in changes in the output frequency.

Figure 12:
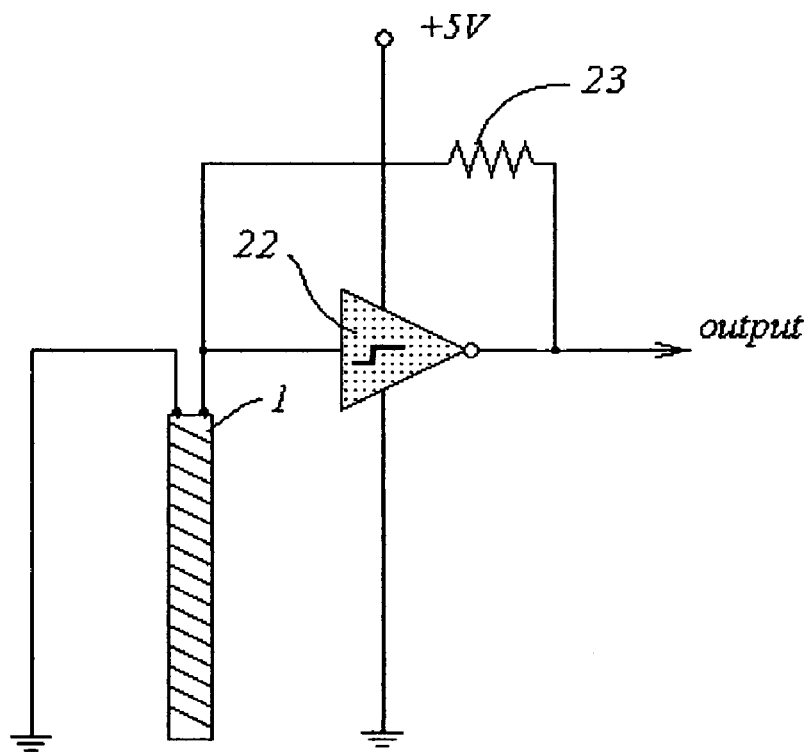
FIG. 12 shows an oscillator circuit with sensing element 1 connected to the input of inverting Schmitt trigger, 22, to affect, with resistor 23, the operating frequency of the oscillator so that a change in the impedance of the sensing element causes a change in the operating frequency of the oscillator.

According to the present invention, sensing element 1 may be operated at a frequency that is lower than its first resonant frequency. For example, in a Schmitt trigger oscillator circuit such as the one shown in FIG. 12, the frequency of oscillation is approximately equal to $1/RC_e$ where R is the resistance of resistor 23, and $C_e$ is the equivalent capacitance of sensing element 1. This assumes that the sensing element will be operating at a frequency where the capacitive impedance is greater than the inductive impedance.

Although it is used as a capacitor in this case, sensing element 1 according to the present invention has advantages over prior art capacitive sensing elements. Since the inductive reactance is non-negligible, the capacitances of individual tape pairs of conductive members, 7, 8, are separated by series inductances. This serves to separate the electromagnetic fields so that they are more concentrated in the desired area near the sensing tapes. Narrowing of the tapes in crossover areas can improve sensitivity. The addition of a dielectric coating can be used to protect the sensing element electrodes, as well as alter the sensor nonlinearity. Varying the thickness of dielectric base 4, or width of screen 10, can be used to alter the nonlinearity.

Figure 13:
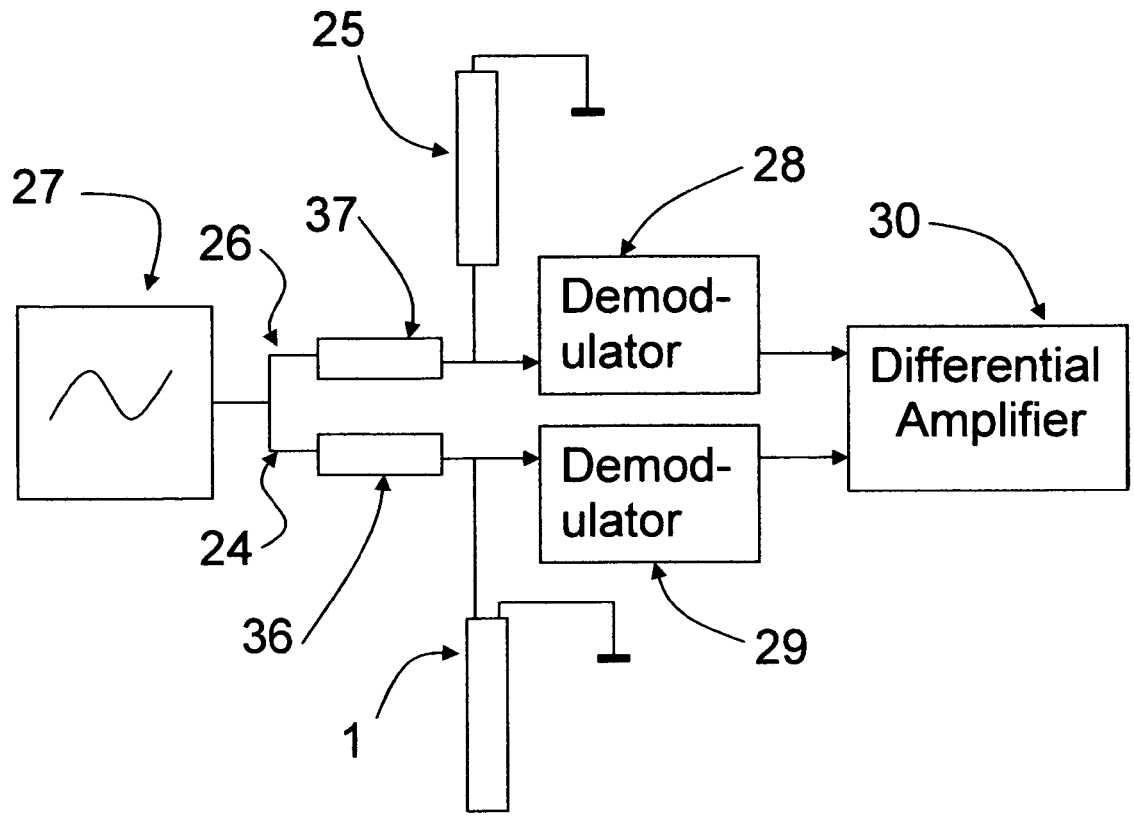
FIG. 13 shows an impedance converter circuit in which sensing element 1 and impedance 36 are connected into a first path, 24, a reference impedance, 25, and impedance 37 are connected into a second path, 26, oscillator 27 energizing at least these first and second paths, rectifying circuits (demodulators), 28, 29, providing a voltage difference signal responsive to changes in a measured variable structure. Differential amplifier, 30, providing an output.

According to a preferred embodiment of the present invention, the variation in the impedance of sensing element 1, due to changes in the measurand, may be converted into an amplitude signal. FIG. 13 shows one version of such a circuit. An oscillator, 27, is connected in a first path, 24, through impedance 36, and with sensing element 1. The AC voltage developed across sensing element 1, is then converted to a DC signal by demodulator 29. Oscillator, 27, is also connected in a second path, 26, through impedance 37, and with reference impedance 25. The AC voltage developed across reference impedance 25, is then converted to a DC signal by demodulator 28. Demodulators suitable for use in converting the (alternating current) AC voltage signals across the respective sensor or reference impedance into (direct current) DC signals are well known in the art. The outputs of the two demodulators 28, 29, are connected to the inputs of differential amplifier, 30. The output of differential amplifier 30 is a voltage of a magnitude that changes with changes in the measurand.

Figure 14:
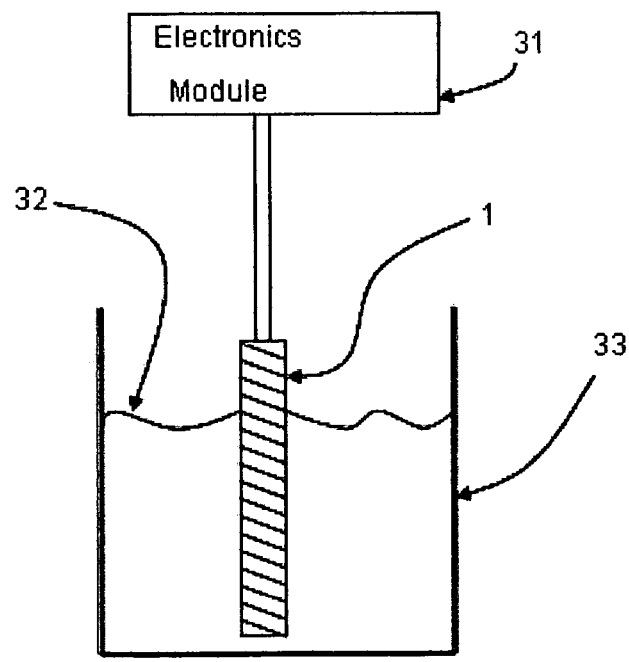
FIG. 14 shows a sensing element, 1, connected with electronics module, 31, to measure fluid level, 32, within vessel, 33.

The present invention can be applied as a fluid level sensor as shown in FIG. 14. Sensing element, 1, is positioned approximately vertically within a volume that may contain a fluid. In the figure, the fluid is contained within a vessel, 33. The sensing element and electronics module, 31, work together to determine the level, 32, of the fluid.

Figure 15:
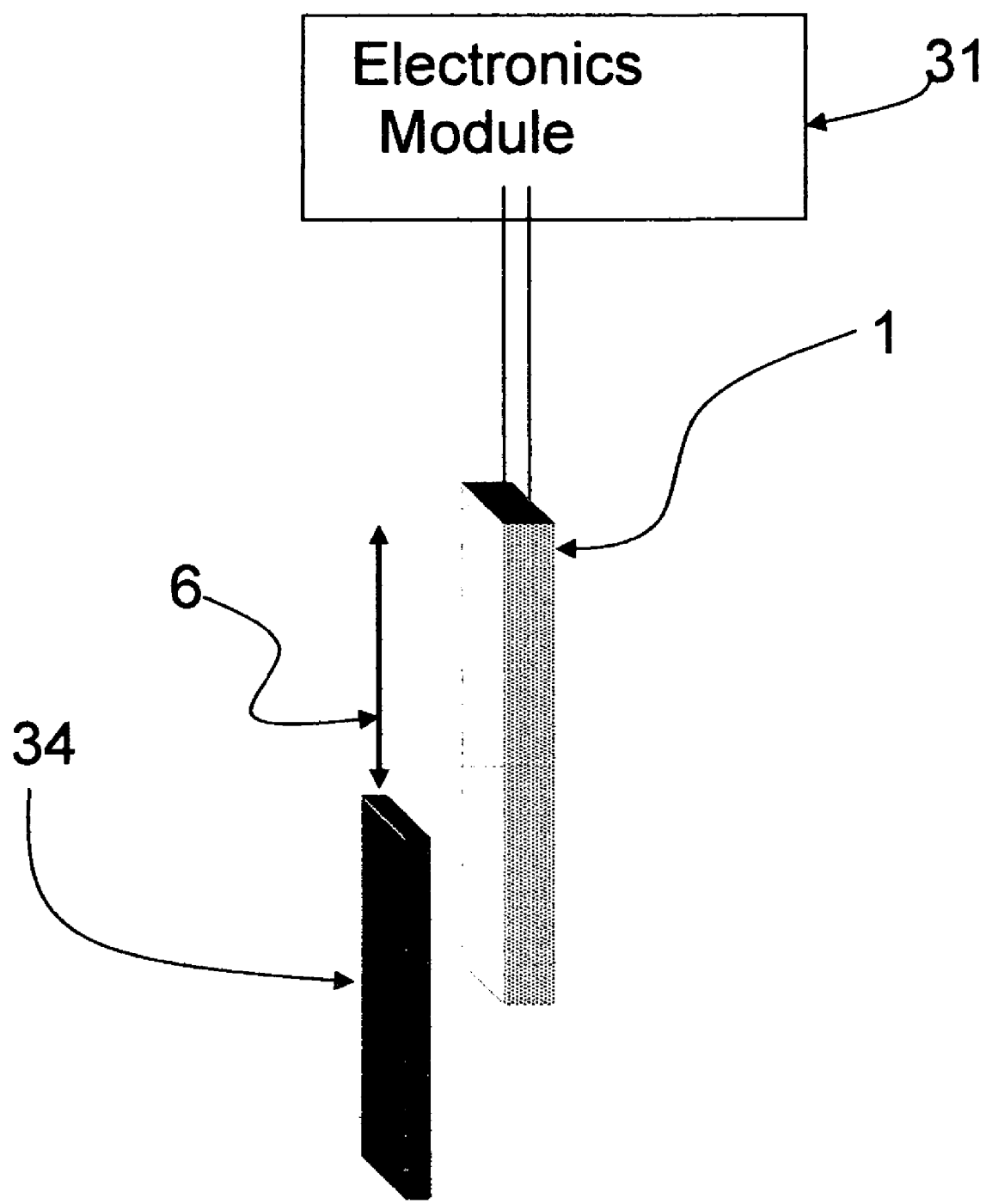
FIG. 15 shows a sensing element, 1, connected with electronics module, 31, to measure the linear position of target, 34, along sensing axis, 6.

When applying the present invention as a position sensor, an example of which is shown in FIG. 15, sensing element, 1, is positioned proximate target 34, so that the target moves along sensing axis, 6. As the target moves along sensing axis, 6, the capacitance and/or inductance of sensing element 1 changes in response. If the target is a dielectric material, the response will be mainly a capacitance change. If the target is electrically conductive, the response can include both capacitance and inductance changes. The sensing element and electronics module, 31, work together to determine the position of the target. Position information can then be differentiated to provide readings of velocity or acceleration.

Figure 16:
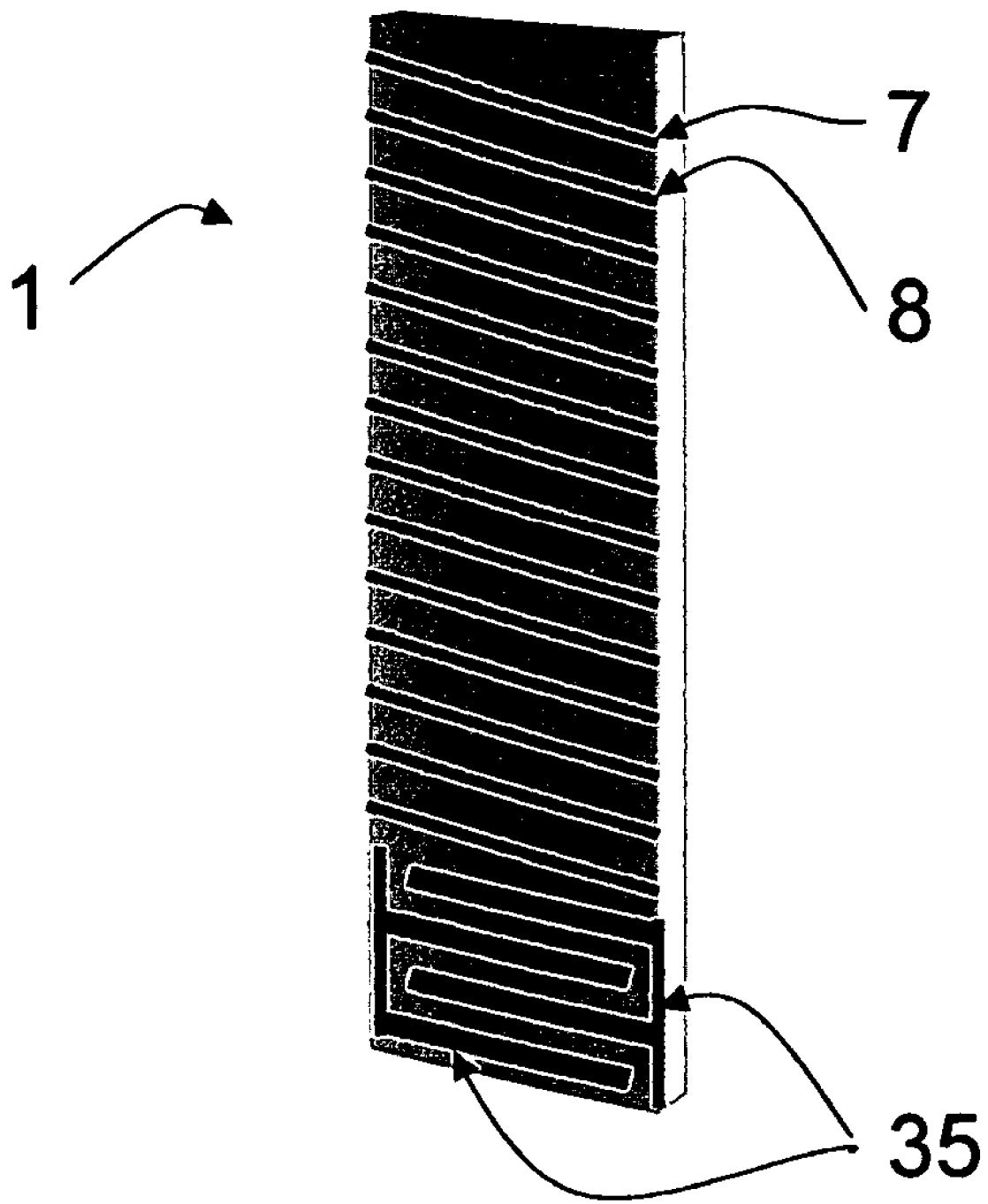
FIG. 16 shows a sensing element, 1, according to the present invention, with conductive members 7, 8, along with the addition of a reference element, 35, the reference element itself can be constructed as a distributed impedance sensor, or as a simple capacitive sensor well known in the art.

Since the permittivity of various fluids can be different, a reference sensor is sometimes used with capacitive fluid level sensors of prior art. Likewise, shown in FIG. 16, a reference element, 35, can be added to a sensing element 1, according to the present invention. In a preferred embodiment of the present invention, the sensing element measures a fluid level by its interaction with conductive members 7, 8. Since the reference element, 35, is located near the bottom of sensing element 1, it will be exposed to the fluid to be measured. The value of the capacitance of reference element, 35, can be used to determine the permittivity of the measured fluid, according to prior art. This can then be used in a suitable algorithm to compensate the level measurement provided by conductive members 7, 8, for variations in permittivity of the fluid.

We claim:

1. An apparatus for measuring at least one parameter of a variable physical structure, comprising:
   a sensing element placed in proximity to the variable physical structure, the sensing element having a length, the sensing element formed of at least two electrically conductive members, at least two of the conductive members electrically insulated from one another, forming first and second sensing electrodes;
   the sensing element having a sensing capacitance between at least the first and second sensing electrodes, the sensing capacitance approximately distributed along the length of the sensing element;
   a variation in at least one of the measured parameters causing a variation of the sensing capacitance, the variation of the sensing capacitance being representative of the variation in the measured parameter;
   the first sensing electrode forming a first inductance, the second sensing electrode forming a second inductance, the first and second inductances approximately distributed along the length of the sensing element;
   at least two of the sensing electrodes excited with an alternating current at an operating frequency, first and second inductances having first and second inductive reactances, respectively, at the operating frequency, the sensing capacitance having a capacitive reactance at the operating frequency;
   the first inductive reactance being at least ten percent of the capacitive reactance, and the second inductive reactance being at least ten percent of the capacitive reactance.

2. The apparatus of claim 1, wherein the variable physical structure is a variable level of a fluid contained within a vessel, the fluid having a higher relative permittivity than 1.5, the sensing element positioned in close proximity to the fluid such that a variation in the fluid level causes a variation in the sensing capacitance, the measured parameter being the level of the fluid, the first and second inductive reactances being essentially constant with changes in the fluid level.

3. The apparatus of claim 2, wherein the sensing element is positioned within forty five degrees of perpendicular to the surface of the fluid, the sensing element having an impedance including the vector sum of the capacitive reactance and first and second inductive reactances, the sum of the magnitudes of the first and second inductive reactances equal to at least 20% of the magnitude of the capacitive reactance.

4. The apparatus of claim 3, wherein the impedance depends upon the level of the fluid, a reference sensor is positioned proximate the sensing element and proximate the measured fluid, the reference sensor having a reference capacitance that varies in response to variations in the permittivity of the fluid,
   electronic circuit means combining the capacitive reactance portion of the impedance and a reactance of the reference capacitance to form a compensated reading, the compensated reading representing the fluid level approximately independent of the permittivity of the fluid.

5. The apparatus of claim 1, wherein at least two of the conductive members approximately form a double helix, at least two of the helical conductive members thus formed being excited by the alternating current in an anti-phase mode.

6. The apparatus of claim 5, wherein the conductive members are at least partially supported by a dielectric structure.

7. The apparatus of claim 5, wherein at least two of the conductive members each have a length and a width, and pass one over the other along at least a portion of their length, and wherein the width of at least one of the conductive members is more narrow in at least one of the portions where one conductor passes over the other.

8. The apparatus of claim 5, wherein a screen conductor is positioned approximately between at least two of the conductive members, the screen conductor having a width, the width changing along the length of the sensing element.

9. The apparatus of claim 5, wherein at least two of the conductive members approximately forming a double helix have a period, the period changing along the length of the sensing element.

10. The apparatus of claim 5, wherein at least two of the conductive members are fashioned as alternate rows of parallel tapes forming first and second patterns, the patterns disposed on first and second sides of a dielectric support structure, the patterns having a width, H, and a period, T, the rows of the first pattern positioned on the first side of the dielectric support structure at an angle a to a longitudinal axis along the length of the sensing element, the rows of the second pattern positioned on the second side of the dielectric support structure at an angle $-\alpha$ to the longitudinal axis, angle $\alpha$ being determined by the approximate relation $$\tan\alpha \approx \frac{H}{T},$$

The parallel tapes each having ends, the ends of the tapes on the first side of the dielectric support structure having electrical connections that connect to the ends of the corresponding tapes on the second side of the dielectric support structure to form two helices with an approximately rectangular cross section.

11. The apparatus of claim 5, wherein the conductive members are disposed on first and second sides of a dielectric support structure, the dielectric support structure having first and second sides, the conductive members fashioned as rows of parallel tapes forming first and second patterns, the patterns having a width, the width changing along the length of the sensing element.

12. The apparatus of claim 5, wherein the conductive members are disposed on first and second sides of a dielectric support structure, the dielectric support structure having first and second sides, the conductive members fashioned as rows of parallel tapes forming first and second patterns, the patterns having a period, the period changing along the length of the sensing element.

13. The apparatus of claim 5, wherein the conductive members have a width, at least two of the conducting members having at least one cross-over area in which one conducting member crosses over another, the width of at least one of the conductive members being more narrow in at least one of the cross-over areas.

14. The apparatus of claim 1, wherein the conductive members are separated from the variable physical structure by a dielectric thickness $\delta$ approximately satisfying the inequality $$\delta < \frac{T}{\pi},$$

Where T is the spacing between adjacent conductive members along the length of the sensing element.

15. The apparatus of claim 1, wherein the conductive members are separated from the variable physical structure by a dielectric thickness, the thickness changing along the length of the sensing element.

16. The apparatus of claim 1, wherein an electronic circuit is connected to at least two of the conductive members, the circuit exciting the sensing element with an alternating current through a first series impedance, the circuit also exciting a reference impedance through a second series impedance, a first voltage being developed across the sensing element, the first voltage varying in response to changes in the variable physical structure, a second voltage being developed across the reference impedance, the second voltage being essentially independent of changes in the variable physical structure, the circuit providing an electrical output representative of a change in the variable physical structure in response to the difference between the first and second voltages.

17. The apparatus of claim 1, wherein the variable physical structure is a movable solid target, the sensing element having a sensing axis, the target free to move along the sensing axis, the target composed of an electrically conductive or dielectric material, movement of the target along the sensing axis causing variation in the sensing capacitance, variation of the sensing capacitance being representative of position, velocity, or acceleration of the target along the sensing axis.

18. A capacitive sensing apparatus for measuring one or more parameters of a variable physical structure, comprising:
   a sensing element formed of at least two electrically conductive members, the conductive members electrically insulated from one another, the sensing element having a length;
   the sensing element positioned proximate the variable physical structure;
   the sensing element having a sensing capacitance, the sensing capacitance approximately distributed along the length of the sensing element;
   variation of at least one measured parameter causing a variation in the sensing capacitance that is representative of the variation in the parameter;
   at least two of the conductive members forming first and second inductances which are approximately distributed along the length of the sensing element;
   the sensing element excited with an alternating current;
   the electrically conductive members supported at least partially by a dielectric support structure.

19. An apparatus for measuring one or more parameters of a variable physical structure, comprising:
   a sensing element positioned proximate the variable physical structure;
   the sensing element having a length;
   the sensing element formed of at least two electrically conductive members, the conductive members electrically insulated from one another;
   the sensing element having a sensing element capacitance between at least two of the conductive members, the capacitance approximately distributed along the length of the sensing element;
   at least two of the conductive members forming first and second inductances which are approximately distributed along the length of the sensing element;
   variation in at least one measured parameter causing a variation in at least one of the first and second inductances representative of the variation in the parameter;
   at least two of the conductive members excited with an alternating current at a frequency whereby inductive reactance of the first inductance is at least ten percent of capacitive reactance of the sensing element capacitance, and inductive reactance of the second inductance is at least ten percent of capacitive reactance of the sensing element capacitance.

* * * * *